Jan. 4, 1966 Y. PELENC 3,227,244
ENERGY STORING CONTROL DEVICE FOR ELECTRIC CIRCUIT BREAKERS
Filed July 13, 1964 3 Sheets-Sheet 2

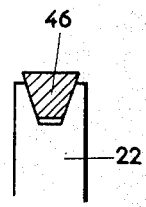
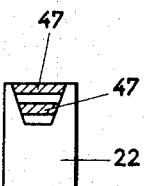
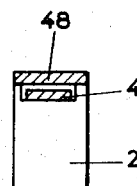
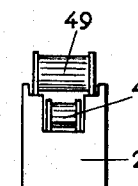
Fig.6  Fig.7  Fig.8  Fig.9
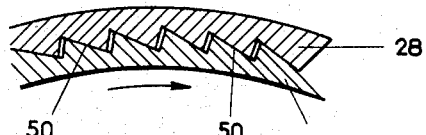
Fig.10
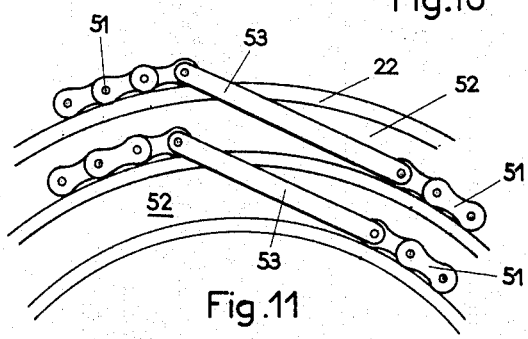
Fig.11
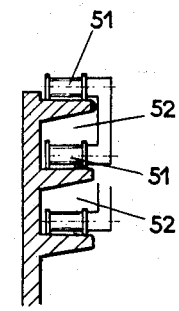
Fig.12
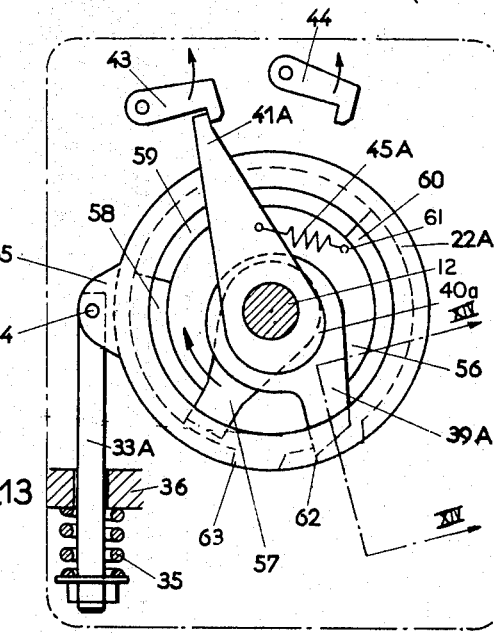
Fig.13
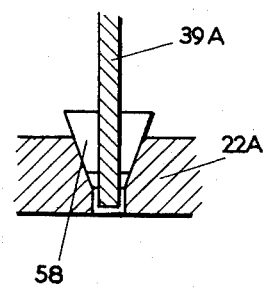
Fig.14

United States Patent Office 3,227,244
Patented Jan. 4, 1966

3,227,244
ENERGY STORING CONTROL DEVICE FOR
ELECTRIC CIRCUIT BREAKERS
Yves Pelenc, La Tronche, France, assignor to Etablissements Merlin & Gerin, Societe Anonyme, Grenoble, France
Filed July 13, 1964, Ser. No. 382,100
Claims priority, application France, July 20, 1963, 942,271
15 Claims. (Cl. 185—39)

The invention relates to energy storing control devices for electric circuit breakers which impart a rotary movement to a control shaft, the movable parts of the device being blocked in the rest positions by means of a drum and an elongated member which is shaped to closely engage the circumference of the drum over at least 180°.

It is an object of the invention to provide a control device which is of strong construction employing a small number of parts and which provides an unobstructed arrangement and a very dependable operation.

The control according to the invention comprises means which are capable of securely coupling the drum and an extremity of the elongated member in such a manner as to create a tension in the latter which causes the blocking of the drum relative to the elongated member.

In making use of the friction effect of an elongated member on a drum, a feature which is well-known in tying up boats, the invention permits the abrupt blocking, in full movement and in positions which may be predetermined with great accuracy, of the elements which are brought to a full rotation by the energy storing device and whose kinetic energy is generally high. Also, it is possible to obtain, with a minimum of parts providing a reduced obstruction, a very high reduction between the force of resistance and the effort necessary to obtain the stopping in a rest position. In this manner the movable part of the control device does not have to be disengaged from the movable assembly of the circuit breaker when the later has reached one of its rest position—either the closed position or the open position.

The invention presents also the advantage that the locking in the different rest positions, particularly in the open position and in the closed position of the circuit breaker, makes use of the same elements of the control device, and only the locking levers need be the same in number as the number of the rest positions.

Figure 1:
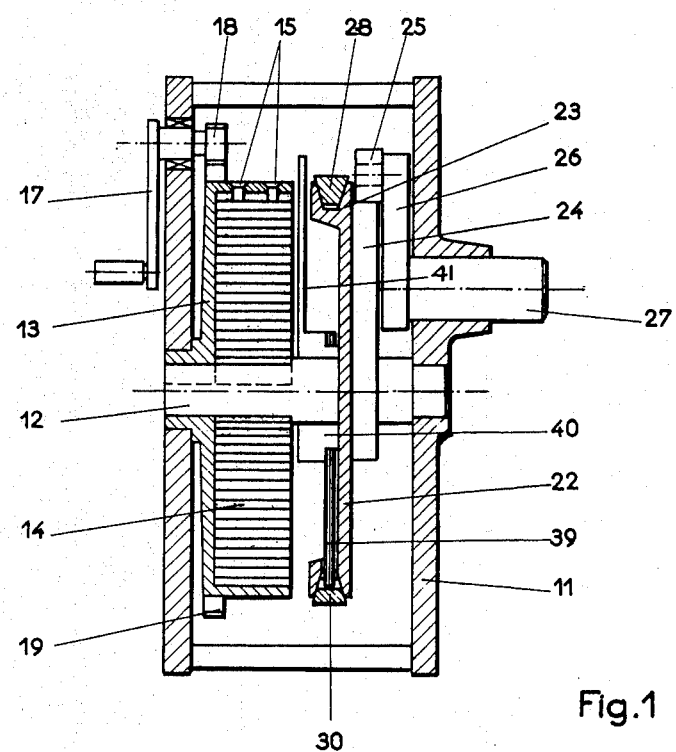
Figures 2, 3:
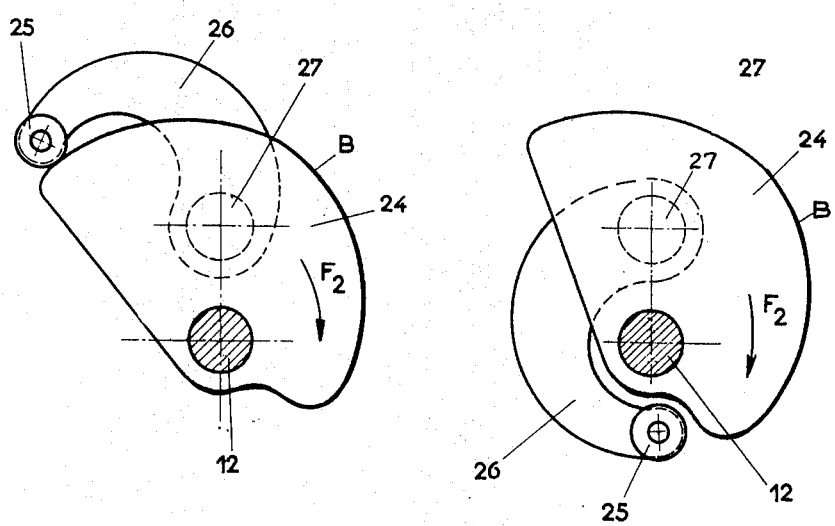
Figure 4:
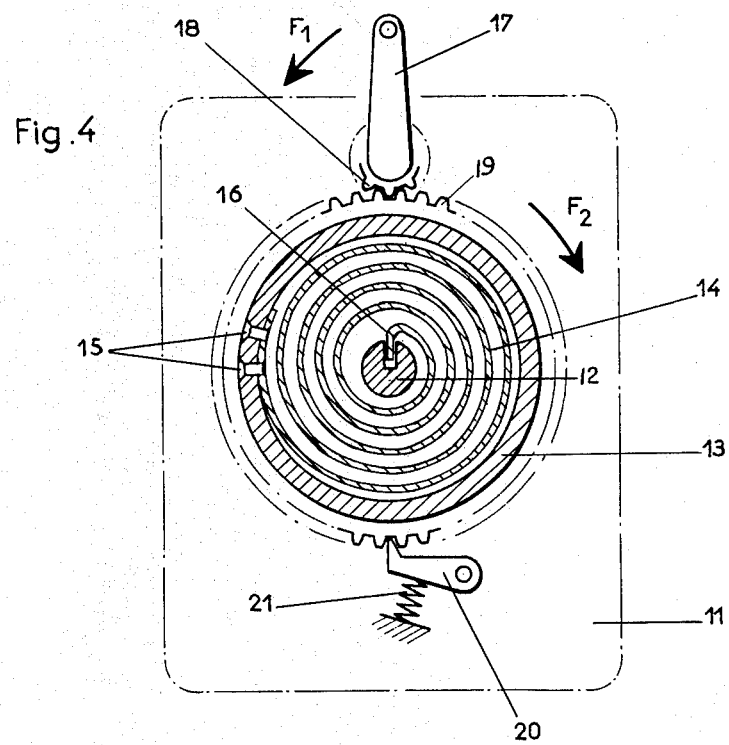
Figure 5:
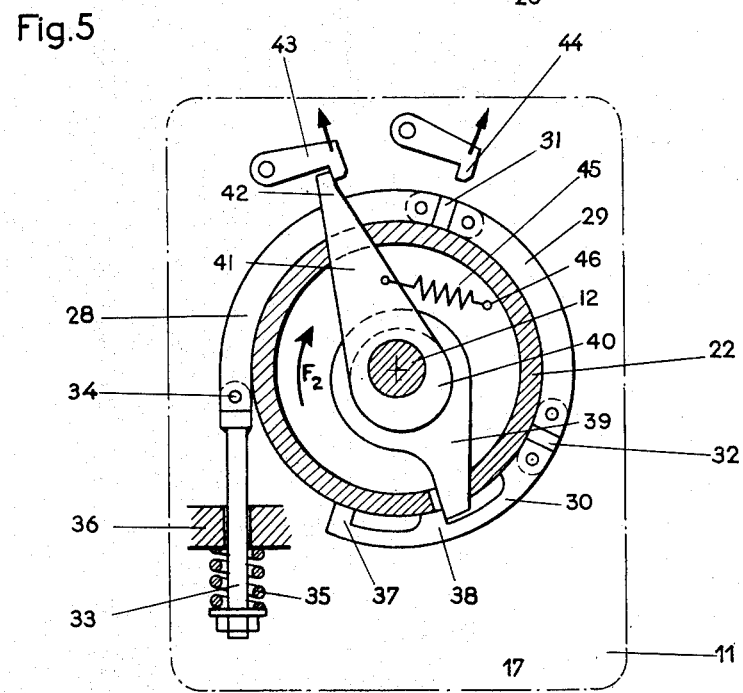

Other features and advantages of the invention will become apparent from the following description in combination with the accompanying drawings which illustrate several examples of the invention and in which:

FIGURE 1 shows an axial section of a control device according to the invention,

FIGURES 2 and 3 show the cam which controls the handle of the controlled apparatus, respectively in positions corresponding to the coupled and uncoupled state of this apparatus, FIGURE 4 shows the energy storing element, FIGURE 5 shows the blocking and locking mechanism, FIGURES 6 to 12 show different forms of the locking mechanism, FIGURE 13 shows a modified blocking device according to the invention, FIGURE 14 shows a section along line XIV—XIV of FIGURE 13 presenting a detailed view on a larger scale.

In FIGURES 1 to 5 the numeral 11 designates the housing of the control device inside of which a control shaft 12 is mounted for rotation. A wheel box or spring case 13 is rotatably mounted inside housing 11 and contains the energy storing element consisting of a spiral spring. One extremity of this spring is fixed at 15 to the wheel box 13, while the other extremity is fixed at 16 to the shaft 12. A handle member 17 allows the tightening of spring 14 by means of a pinion 18 and a gear wheel 19 which is fixed to the wheel box 13. A pawl 20 is subjected to the effect of a spring 21 and cooperates with the gear 19 to prevent the rearward rotation of the wheel box 13. A drum 22 which comprises a peripheral trapezoid shaped recess 23 and a cam 24 are fixed to the shaft 12. A roller 25 which is mounted on a cranked handle 26 controls, through the intermediary of the output shaft 27, the movable assembly of the controlled apparatus which may be a circuit breaker for example, and which is not shown in the drawing.

An elongated member which consists of three metal members 28, 29 and 30 which are shaped in the form of an arc and which are in the form of a trapezoid in transverse section, is inserted into the recess 23, the different elements being interconnected by coupling links 31 and 32. The free extremity of the first element 28 is secured in a resilient manner to the housing 11 through a rod 33 which is articulated at 34 on member 28 and by a compression spring 35 which bears on the lower extremity of rod 33 on the one hand and on a fixed part 36 of housing 11 on the other hand. Of course the spring 35 may be replaced by some other type of shock absorber such as a silent-block. The member 30 is provided with two stop lugs 37, 38 for engaging a pawl 39 mounted for rotation on an excentric shaft 40 whose angular position is determined by an arm 41. The extremity 42 of this arm may lock behind projecting noses of control levers 43, 44 for providing respectively an opening and closing action. The pawl 39 passes through an opening in drum 22 in such a manner as to be taken along during rotation of the latter. A draw spring 45 whose one extremity 46 is fixed to drum 22 imparts a return stress on arm 41.

The control device operates in the following manner:

In rotating the handle 17 in the direction of arrow $F_1$ the wheel box 13 is rotated so as to tighten spring 14. This action may take place independently of the operation of the remainder of the device. It may for example be carried out automatically after each coupling action.

Under the influence of the biasing effect of spring 14 the shaft 12, drum 22 and cam 24 are constantly urged in the direction of arrow $F_2$. However, when the elements are in the positions illustrated in FIGURES 1, 2 and 5, where the circuit breaker would be in the closed or coupled position, the drum 22 is blocked by the segments 28, 29 and 30 which are tensioned by pawl 39 locked behind the lug 38 and urged by the drum 22 in the direction of arrow $F_2$. This self-blocking is obtained by using the friction forces of the segments on the drum in the manner of tying up a boat which allows to obtain a substantial reduction of the effort. It is known that the friction forces of a rope or belt which is wound on a cylinder have the effect of reducing the tension to which the rope is subjected as the latter is wound on the cylinder. Thus, for example, to compensate a tension T which is exerted on the rope, it is only necessary to exert a tension $$t = \frac{T}{e\alpha f}$$

on the free end, $\alpha$ being the winding angle, $f$ being the friction coefficient and $e$ being equal to the sum of the convergent series $$\left(1 + \frac{1}{m}\right)^m$$

where $m$ tends to infinity.

The circuit breaker or switch is maintained in the closed position by the roller 25 which bears against a portion of cam 24 shaped preferably in the arc of a circle which is centered on the center of rotation in such a manner as to avoid any reaction of the movable assembly of the switch on the cam which would tend to rotate the latter. In order to cause the uncoupling and the opening of the switch it is sufficient to allow cam 24 to make a slight rotation in the direction of arrow $F_2$ (shaft 12 turning always in the same direction) in such a manner that the roller 25 subjected to the effect produced by the uncoupling springs (not shown) of the switch may escape the range of the end of the cam profile and return freely into the position illustrated in FIGURE 3.

In order to permit this rotation the unlocking lever 43 is lifted so as to free the arm 41 which rotates under the influence of spring 46 in the direction of arrow $F_2$ until it is stopped by the nose of the locking lever 44. During this movement of arm 41 the eccentric member 40 rotates by the same angle as the arm in such a manner as to force pawl 39 to withdraw from lug 38. At this moment the elements 28, 29 and 30 are no longer subjected to the longitudinal tension, and the friction on the drum ceases so that the latter may continue its movement. When pawl 39, which drum 22 forces to rotate, is located approximately in the same position relative to arm 41 as that shown in FIGURE 5, the pawl projects again and locks this time behind lug 37 to subject abruptly elements 28, 29 and 30 to a tension effect. Consequently the drum is also blocked again abruptly in an exactly predetermined position, the spring 35 having absorbed the kinetic energy of the rotating masses. The switch has opened and the handle 26, the roller 25 and cam 24 are in the position illustrated in the FIGURE 3.

The handle 26 has a cranked shape and different elements are arranged in such a way that the centers of rotation of cam 24, roller 25 and handle 26 are approximately in line in the open position of the switch, which allows shaft 12 to enter inside the cranked part of the handle 26 to assure a large angle of movement of the latter.

In order to cause the closing of the switch the operation is similar to that just described: The lever 44 is lifted to free the arm 41 which upon rotation unlocks pawl 39 from lug 37 and thus allows rotation of drum 22, of shaft 12 and of cam 24 in the direction of arrow $F_2$. During rotation the ramp B of cam 24 causes roller 25 to move away from the center of rotation of the cam which imparts to handle 26 a rotating movement in the direction of arrow $F_2$ causing the closing of the switch. When the roller 25 and cam 24 have arrived in the position illustrated in FIGURE 2, the arm 41 is already locked behind the nose of lever 43 causing the pawl 39 to come out shortly before the extremity of the latter approaches lug 38. After the locking action the elements 28, 29 and 30 are tensioned and block the drum 22, the shock absorber 35 absorbing the kinetic energy of the rotating masses.

It will be noted that with the exception of only levers 43 and 44 all the other elements of the locking device are employed for maintaining the apparatus in the closed position as well as in the open position.

It is obvious that the tensioning of elements 28, 29 and 30 may be obtained in other ways than by the mechanism described above. One could, for example, exert at a desired moment a radial pressure on the free extremity of the chain of elements, the adhesion between the circumference of drum 22 and this portion of the latter element causing this tensioning effect. On the other hand, one could provide means which allow a progressive tensioning of the chain of elements in such a manner as to cause the self-locking action to be preceded by a sliding movement relative to the drum and the elements, which would result in a braking action preceding the blocking action. In this case the opposite extremity of the chain could be rigidly secured.

There are several means for increasing the reduction which is obtained by the cooperation of the drum with a member which conforms in shape to its circumference. One may, for example, increase the winding angle or the friction coefficient (provision of oblique surfaces). This would be obvious to a person skilled in the art, and for example, as shown in FIGURE 6, the elongated member may consist of a trapezoid belt 46 made of a single piece of metal or of a rigid synthetic material. The belt 46 travels in a similarly trapezoid recess of drum 22 and may present cross-sectional reductions which would impart some flexibility to the belt.

In FIGURE 7 the belt 47 which may be of metallic or plastic material is made of a single piece of decreasing width which allows it to be wound spirally in several turns into the recess of the drum 22. This allows for the possibility of high winding angles and consequently important ratios between the tensions T and $t$ For the same purpose of increasing the winding angle one could obtain several concentric winding turns by means of belts 48 of rectangular profile and having a decreasing width as shown in FIGURE 8, or as illustrated in FIGURE 9, by means of chains 49 of widths which decrease in a discontinuous manner at each turn, each section of constant width being lodged in a recess of appropriate dimensions.

In the arrangements of FIGURES 7, 8 and 9 the sections of the belts decrease as the internal tension decreases.

In the case of FIGURE 7 one may also provide belts or chains whose width decreases abruptly by gradients.

FIGURE 10 shows another form according to which the drum 22 and the elongated member 28 have a toothed form in such a manner as to cooperate according to the inclined planes 50 so as to increase the friction.

The FIGURES 11 and 12, of which FIGURE 12 is a radial section of FIGURE 11, show an example in which a chain 51 is wound by several turns into the cylindrical and concentric grooves 52 of drum 22. Coupling links 53 provide the connection between the elements of the chain located at different levels. It is also possible to arrange the elongated member 28 but on the inside, rather than on the outside, of the circumference of drum 22.

An example of this embodiment is shown in FIGURES 13 and 14.

The drum 22A of annular form is mounted freely on shaft 12, its rotation being limited by rod 33A which is articulated at 54 on a boss 55 of drum 22A. The lower extremity of rod 54 is fixed as above by means of the shock absorber 35 consisting of a spring which bears against the fixed part 36. A disc 56 comprising a drive finger 57 is fixed to shaft 12 and this finger 57 bears against one end of several elements 58, 59 and 60, aligned end to end and shaped as an arc of a circle. The opposite extremity of the series of elements is in contact with pawl 39A mounted for rotation on the excentric member 40A of arm 41A in the manner described above. One end of the return spring 45A is attached at 61 to disc 56. The drum 22A has formed thereon two stopping lugs 62, 63 adapted for retaining the pawl 39A. The elements 58, 59 and 60 are pressed against each other without the need of providing linkage members. They have for example a trapezoid shaped cross-section so as to conform with the walls of a trapezoid shaped recess of drum 22A as shown in FIGURE 14.

It is obvious that the lifting of the locking lever 43 or 44 causes a rotation of arm 41A, the release of pawl 39A and the rotation of shaft 12, of disc 56, of elements 58, 59, 60, which are driven by drive finger 57, and of pawl 39A.

The locking of arm 41A causes, in the above described manner, the ejection of pawl 39A which locks behind one or the other of the lugs 62, 63 causing the compression of elements 58, 59 and 60 and the blocking of the latter on the drum 22A.

What is claimed is:

1. An energy control device for electric circuit breaker for rotating a control shaft, said device comprising a housing, a drum member mounted on said housing, an elongated member conforming in shape to the circumference of the drum member over at least 180° thereof, an energy source coupled to one of said members, the other of said members being secured to said housing for limited movement with respect thereto, and means for securely interconnecting the drum member and one extremity of the elongated member in such a manner so as to create a tension in the elongated member due to said energy source, thus causing the blocking of the drum member relative to the elongated member, said drum member and said elongated member blocking the movable parts of the device in the rest positions.

2. The device according to claim 1 wherein the elongated member engages the drum member on the inside.

3. The device according to claim 1 wherein said means comprise a pawl which extends through an opening in the drum member.

4. The device according to claim 1 wherein one extremity of the elongated member is resiliently fixed to the housing by a shock absorber susceptible of absorbing the kinetic energy of the movable parts after blocking of the drum member.

5. The device according to claim 1 wherein the elongated member comprises a plurality of metallic segments which are pivoted to each other and which bear against the circumference of the drum member on the outside.

6. The device according to claim 1 wherein the elongated member comprises a wear liner.

7. The device according to claim 1 wherein the elongated member comprises a chain.

8. The device according to claim 1 wherein the elongated member is wound in several turns on the circumference of the drum member.

9. The device according to claim 1 wherein the elongated member has inclined sides of a V-shape engaging closely a peripheral recess of the drum member.

10. The device according to claim 1 wherein the elongated member has a decreasing thickness so as to be spirally wound into a peripheral recess of the drum member.

11. The device according to claim 5, wherein the elongated member comprises several elements of varying width connected in series, each element being lodged in a corresponding part of a graduated peripheral recess of the drum member.

12. The device according to claim 1, wherein the elongated member and the drum engage along inclined surface planes forming meshing teeth.

13. The device according to claim 2, wherein the elongated member consists of a series of metallic segments placed end to end conforming to the inner circumference of the drum member, the drum member is resiliently fixed to said housing, and the segments are rotated by said control shaft, and wherein said interconnecting means comprises a clutch member for causing one extremity of said segment to abut and block said first member.

14. The device according to claim 13 wherein said clutch member comprises a plurality of stopping lugs disposed on said drum and a pawl adapted to move radially relative to the drum and to lock behind one of said stopping lugs.

15. The device according to claim 3 wherein said means further comprises a plurality of locking lugs on said elongated member, a single arm mounted for rotation on the shaft of the drum member, a plurality of retractable locking levers adapted to engage said arm, and an eccentric member fixed to the arm controlling the penetration of the pawl behind the locking lugs of the elongated member.

References Cited by the Examiner

UNITED STATES PATENTS

| | | | |
|---|---|---|---|
| 1,027,087 | 5/1912 | Tubbergan | 185—39 |
| 1,838,843 | 12/1931 | Kohler | 185—39 |

EDGAR W. GEOGHEGAN, *Primary Examiner.*

SAMUEL LEVINE, *Examiner.*